United States Patent [19]

McLain et al.

[11] 4,248,062

[45] Feb. 3, 1981

[54] DRIVE SHAFT ASSEMBLY AND METHOD FOR MAKING SAME

[75] Inventors: Philippe H. McLain, Gilbert; Robert J. Shrontz; Dominick Tringali, both of Columbia, all of S.C.

[73] Assignee: Shakespeare Company, Columbia, S.C.

[21] Appl. No.: 82,006

[22] Filed: Oct. 5, 1979

[51] Int. Cl.³ .............................. F16C 1/00; F32B 1/08
[52] U.S. Cl. .......................................... 64/1 S; 64/1 R; 64/2 R; 138/130; 156/148; 156/149; 156/143; 156/173
[58] Field of Search ................. 64/1 S, 1 R, 2 R, 1 C; 138/123, 124, 4–7 C, 34, 125, 130, 144; 156/148, 173, 149, 143, 86, 188; 285/423

[56] References Cited
U.S. PATENT DOCUMENTS

| 2,747,616 | 5/1956 | Ganahl | 138/130 |
| 2,969,812 | 1/1961 | Ganahl | 138/130 |
| 3,791,898 | 2/1974 | Remi | 138/130 |
| 4,089,190 | 5/1978 | Worgan et al. | 138/130 |
| 4,171,626 | 10/1979 | Yates et al. | 138/130 |
| 4,173,670 | 11/1979 | Van Auken | 138/130 |
| 4,186,696 | 2/1980 | Linsenmann | 138/130 |

Primary Examiner—Ira S. Lazarus
Assistant Examiner—Magdalen Moy
Attorney, Agent, or Firm—Hamilton, Renner & Kenner

[57] ABSTRACT

A composite drive shaft having a hollow tubular, multi-layered fiber reinforced plastic shaft portion (11) with a metallic sleeve (13) inserted in and bonded thereto at least at one end, said sleeve (13) having universal joint connector means (12).

22 Claims, 8 Drawing Figures

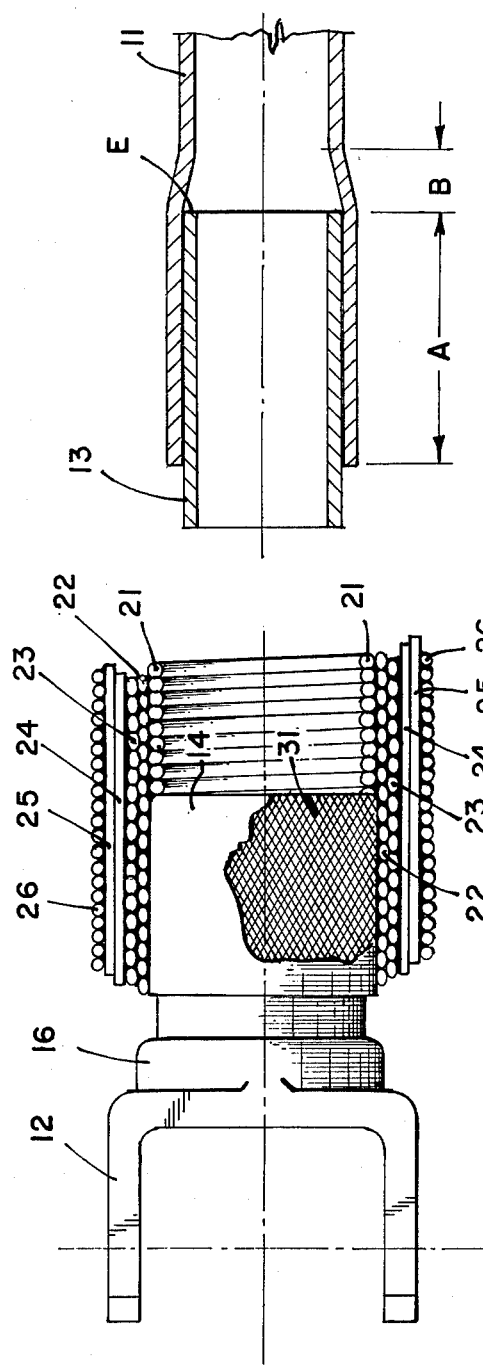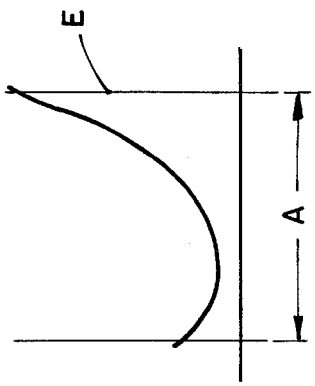

DRIVE SHAFT ASSEMBLY AND METHOD FOR MAKING SAME

TECHNICAL FIELD

The present invention relates to a drive shaft assembly, containing composite material, for receiving torque from a vehicular transmission, or the like, and imparting said torque to a vehicular differential, or the like. Such a composite drive shaft comprises a hollow, tubular, fiber reinforced plastic shaft portion which receives a metallic sleeve at each end, which sleeves provide a means for connecting the drive shaft to the torque transmitting and receiving members, such as those mentioned above.

The present invention also relates to a method for making the drive shaft assembly.

BACKGROUND ART

In an effort to make vehicles more fuel efficient the automotive industry is making an all out effort to determine, and employ, acceptable ways in which to make their future models lighter.

At the present time vehicular shafts are normally made of tubular steel having a high flexural modulus—generally on the order of $30 \times 10^6$ psi ($2.1 \times 10^{11}$ N/m$^2$). The tubular steel drive shafts also have a high specific gravity—generally on the order of 7.7. As a result, the drive shaft itself is a relatively heavy item in an automobile.

It is well known that at certain rotational speeds a drive shaft becomes dynamically unstable and excessive vibrations are likely to develop. This phenomenon is a result of resonance, and the critical speed—i.e., the number of revolutions per second—at which this instability occurs is equal to the frequency of the natural vibration for the particular shaft. The critical speed for a drive shaft is generally proportional to the flexural modulus of the shaft and its moment of inertia, and, generally inversely proportional to its weight and length.

In order to maintain an acceptably high critical speed with tubular steel shafts, multiple, short sections are generally employed, each section being operatively connected to the successive section by a universal joint. The use of multiple universal joints operatively to interconnect the successive sections of the drive shaft further compounds the overall weight of the drive shaft assembly.

Fiber reinforced plastic shafts offer a distinctly suitable alternative to the steel, tubular shaft. Reinforcing materials such as glass, graphite and other fibers, or combinations of fibers, encapsulated in a thermosetting plastic matrix at a ratio of 50% to 70% fiber, by volume, produce fiber reinforced plastic materials having flexural moduli in the range of 5 to $25 \times 10^6$ psi ($3.5 \times 10^{10}$ to $1.7 \times 10^{11}$ N/m$^2$) with a specific gravity in the range of 1.6 to 2.0, depending upon the particular materials and ratio employed.

An exemplary, fiber reinforced, hollow shaft, the method by which and the apparatus on which such a shaft can be made, are disclosed in U.S. Pat. No. 4,089,727, which patent is owned by our common assignee, Shakespeare Company.

The considerably lighter weight and larger moment of inertia of a fiber reinforced plastic drive shaft as compared to the weight of a tubular steel drive shaft taken in conjunction with only a moderately reduced flexural modulus allows a longer drive shaft to replace the multisection steel shafts at a comparable critical speed. Thus, not only is the weight of the shaft itself reduced but also, because the fiber reinforced shaft can be longer in comparison to a tubular steel drive shaft having the same critical speed, the weight of the complementary components can be reduced. For example, a number of the universal joints can be eliminated.

However, fiber reinforced members have heretofore not been considered satisfactory for automotive drive shafts for several reasons. First, no one fully appreciated the advantageous critical speed achievable with such a construction. Second, the satisfactory means of effecting an acceptable connection between the fiber reinforced drive shaft and the metallic yoke of a universal joint was unknown. Previous attempts demonstrated how difficult it is to effect a connection which can resist the forces imposed on the completed drive shaft assembly while maintaining the accurate alignment between the shaft and the structure by which the universal joint is secured thereto.

Utilization of fiber reinforced members for automotive drive shafts is therefore predicated upon the capability to form a bond between the fiber reinforced shaft and the yoke for accepting a universal joint which is able to endure the high torque and flexural forces, fatigue and temperature extremes from about $-60°$ F. to about $400°$ F. ($-50°$ C. to $205°$ C.) to which automotive drive shafts are subjected.

The bond between the fiber reinforced shaft and the yoke, or rather between the shaft and a sleeve to which a yoke is attached, has previously been effected by several methods. According to one method, a prepared and cured fiber reinforced shaft is either adhesively attached or mechanically lashed to the sleeve as by bolting or riveting. According to another method, the fiber reinforced shaft is fabricated by winding onto a mandrel containing the sleeve and thereafter the sleeve-shaft assembly is cured.

Fiber reinforced plastic drive shafts are generally comprised of several layers of fiber reinforced resin laminate. The innermost layer is comprised of fibers of glass, graphite or other materials, or combinations thereof, having a Young's modulus of at least about $10 \times 10^6$ psi ($6.9 \times 10^{10}$ N/m$^2$). In order to provide the hoop strength and stiffness necessary to prevent buckling and circular deformation of the shaft when under the torsional and flexural loads of operating conditions, the fibers of the innermost layers must be spirally wrapped that is, oriented relative to the longitudinal axis of the shaft at helix angles of less than 90° but greater than about 80°.

Subsequent layers of such fibers are oriented with respect to the longitudinal axis of the shaft at helix angles which may vary from 0° to about 6.°, in order to provide the necessary properties for obtaining critical speed, torsional and flexural rigidity and strength to resist both torsional and flexural loads. Usually, the outermost layer of fibers is also wrapped spirally, that is, oriented at a helix angle of less than 90° but greater than about 80°.

Each of the layers of fibers in the shaft have, conventionally, extended over the sleeve to form a bond between the shaft and sleeve. Included in this overlapping portion, is the spiral wrap having a helix angle within the range of about 80° to just less than 90°.

Composite drive shafts having the above described construction have been found to be unsatisfactory when tested over the range of conditions incurred during automotive operation. One area in which drive shaft failure has occurred during these tests is in the sleeve-shaft bonding area.

We have discovered that drive shaft failure in the sleeve-shaft bonding area is promoted by the extension of the innermost spiral fiber wrap over the sleeve. Although the exact cause of this phenomenon is unknown, it is thought to result at least in part, from the varying thermal coefficients of expansion for the various materials comprising the completed drive shaft assembly.

The fibers utilized in composite drive shafts generally have lower longitudinal thermal coefficients of expansion than the metal sleeves contained therein, while the resins used generally have a higher coefficient. After the drive shaft assembly is heated, either during a curing step in the manufacture of the assembly or during operation in a vehicle, upon cooling the metal sleeve will contract away from the shaft portion. Although the resin would ordinarily tend to contract to a greater degree and thus adhere more firmly to the sleeve, it is prevented from doing so by the spirally wrapped fibers.

The fibers, having a lower thermal coefficient of expansion than the metal sleeve, will not contract upon cooling to as great a degree as will the metal sleeve. The hoop strength of the spiral wrap, needed to resist circular deformation of the shaft itself, in this instance prevents not only the fibers from conforming in any way to the contracted sleeve, but also prevents the resin structure which is bonded to the fibers from doing so. The adhesion between the shaft portions and sleeve is broken and drive shaft failure results.

DISCLOSURE OF THE INVENTION

It is, therefore, an object of the present invention to provide a fully acceptable, drive shaft assembly which employs a fiber reinforced plastic shaft portion.

It is another object of the present invention to provide a drive shaft assembly, as above, in which an effective bond is assured between the shaft itself and the yoke of a universal joint sufficient to resist the flexural and torque forces imposed upon a completed drive shaft assembly.

It is yet another object of the present invention to provide a drive shaft assembly, as above, in which an effective bond is assured between the shaft itself and the yoke of a universal joint sufficient to resist the fatigue and temperature range to which such a drive shaft assembly is subjected.

It is a further object of the present invention to provide a method by which to produce a fully acceptable drive shaft assembly which employs a fiber reinforced plastic shaft portion.

These and other objects, together with the advantages thereof over existing prior art forms, which will become apparent from the following specification, are accomplished by means hereinafter described and claimed.

In general, a drive shaft assembly embodying the concept of the present invention employs a tubular, fiber reinforced plastic shaft comprised of a plurality of layers of angularly oriented reinforcing fibers, and having a radially inwardly directed surface. A bonding portion of the inwardly directed surface of the shaft embracingly conforms to the radially outwardly directed surface of a sleeve, preferably a resin coated metallic sleeve, positioned at each end of the shaft.

The bonding portion of the inwardly directed surface of the shaft is formed by a layer of resin impregnated fibers having an angular orientation with respect to the longitudinal axis of the shaft which allows the fibers and their associated resin matrix to contract upon and conform to the outwardly directed surface of the also contracting sleeve as the shaft-sleeve assembly cools both during manufacture and after operation of the assembly.

The yoke of a universal joint may be secured to the metallic sleeve, as by welding an intermediate bridge therebetween, and the finished assembly balanced by the application of balancing weights appropriately disposed about one or both sleeves.

The preferred method for making a unique drive shaft assembly embodying the concept of the present invention comprises the step of providing a resin-coated metallic sleeve for each end of the shaft. The sleeves are mounted on a mandrel in appropriately spaced relation longitudinally along the mandrel.

A plurality of layers of fiber reinforced plastic material is applied over the mandrel and at least a portion of the sleeves mounted thereon, such that the fibers of the first layer applied over the sleeves have an angular orientation allowing conformation to the sleeve surface as set forth above. The fiber reinforced plastic material is then cured. One alternative of the subject method contemplates the use of a consumable mandrel which remains within the shaft. An alternative method contemplates removal of the mandrel after the fiber reinforced plastic has been cured.

In either event, after the fiber reinforced plastic has been cured the yoke of a universal joint may be secured to the sleeve and the resulting assembly balanced.

According to another method for making a drive shaft assembly embodying the concept of the present invention, the sleeves may be provided as above, and a prepared, cured fiber reinforced plastic shaft may then be adhesively bonded to the sleeves, such that the inwardly directed surface of the shaft, which conformingly contacts the sleeve, is comprised of a layer of fibers having an angular orientation as set forth above.

Two alternative embodiments of a drive shaft assembly embodying the concept of the present invention are shown by way of example in the accompanying drawings and described in detail without attempting to show all of the various forms and modifications in which the invention might be embodied; the invention being measured by the appended claims and not by the details of the specification.

BRIEF DESCRIPTION OF THE DRAWINGS

FIG. 3 is an enlarged schematic cross section of the drive shaft of FIG. 2, the thicknesses of the various fiber reinforced layers being exaggerated.

FIG. 4 is a schematic cross section of the joint between the metal sleeve and the fiber reinforced drive shaft when provided with an inner layer of glass cloth coextensive with the bonding area of the sleeve.

FIG. 5 is a graph representing the stress distribution over the bonding area of the joint of FIG. 4.

PREFERRED MODES FOR CARRYING OUT THE INVENTION

Figures 1, 2:
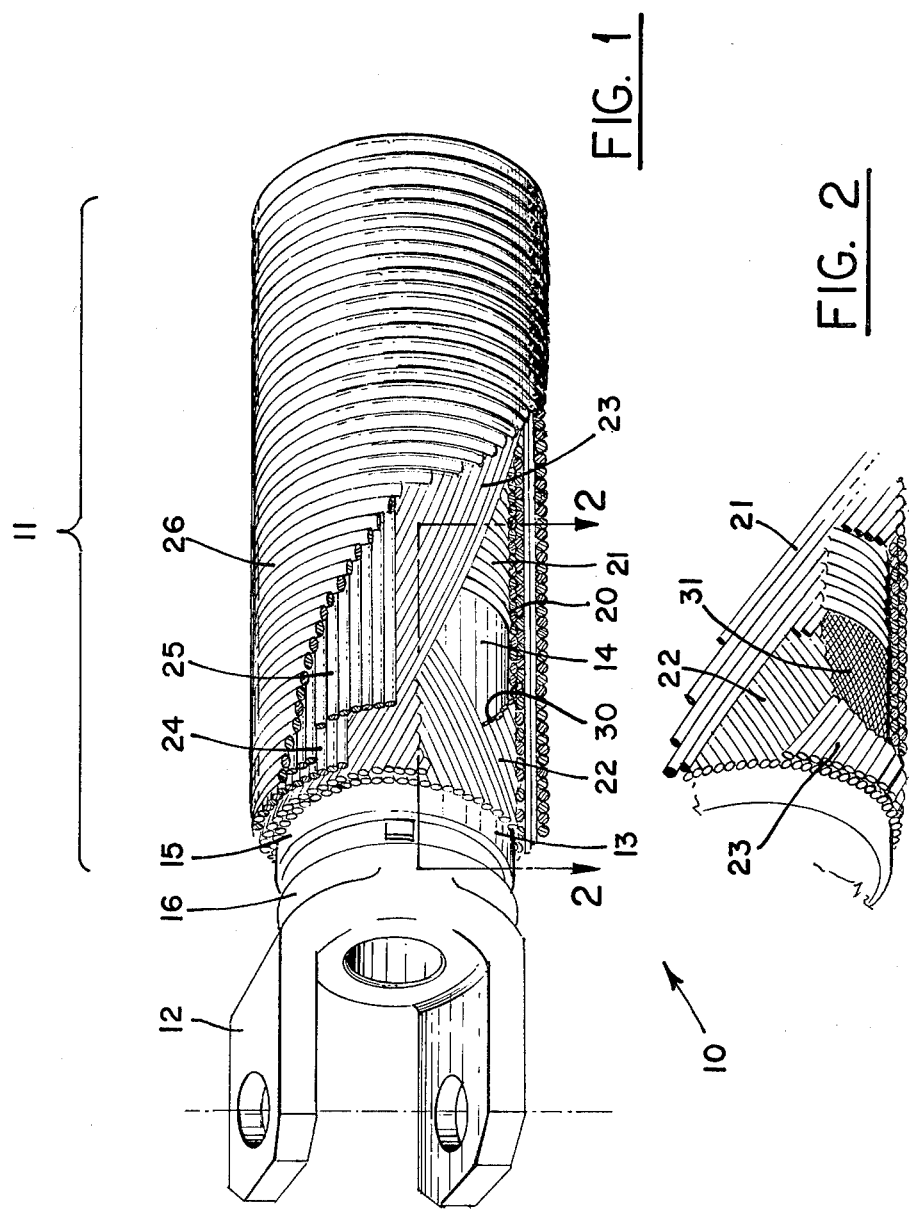
FIG. 1 is a schematic perspective of a representative portion of a drive shaft assembly embodying the concept of the present invention, partly broken away to expose the various layers of the fiber reinforced shaft portion and their relation to the sleeve for attachment to the yoke. The portion of the drive shaft assembly not shown is substantially a mirror image of the portion depicted.
FIG. 2 is a schematic side elevation of a portion of the drive shaft taken along line 2—2 of FIG. 1, partly broken away, depicting an alternative mode of bonding the fiber reinforced shaft portion to the sleeve.

A drive shaft assembly embodying the concept of the present invention is indicated generally by the numeral 10 on the attached drawings. The drive shaft assembly 10 has a shaft portion 11 that is preferably tubular and which is comprised of fiber reinforced plastic materials.

The yoke 12 of a universal joint is secured to each end of the shaft portion 11 by attachment to corresponding sleeves 13, preferably metallic, in which case attachment may be effected by welding. The sleeves 13 in turn are embracingly enveloped by the fiber reinforced plastic material of the shaft portion 11, that is, the reinforcing fibers and the resin matrix.

The reinforcing fibers employed in the fiber reinforced plastic material may be boron, glass, graphite or other filaments, either natural or synthetic, or combinations thereof. Examples of suitable organic fibers are the polyamides, such as are available from E. I. du Pont de Nemours and Co. under the registered trademark "Kevlar."

The particular type of synthetic resin selected will be chosen for its characteristics with respect to the specific service conditions it will need to endure, as well as with respect to the extent of adhesion it must provide between the fiber reinforced shaft portion 11 and the sleeve 13 embraced by the fiber reinforced plastic. Among those resins generally suitable for fiber reinforced plastic members are the polyesters, the vinyl esters and the epoxys.

Additional factors which may be considered in selection of the resin are viscosity, gel time, strength, moduli, shrinkage after curing and cost. Ingredients such as pigments, catalysts and fillers are common additives to a resin mixture, and the term resin as used hereinafter is intended to include any mixture of ingredients generally suitable for fiber reinforced plastic members. The foregoing resins are generally cured by heat, and the reaction is ordinarily initiated in the range of 250° to 280° F. (121° to 138° C.), but because the reaction is exothermic, the temperature may rise to over 400° F. (204° C.), and it is therefore understood that the temperature ranges will vary with respect to the type of resin selected. It should be emphasized that the fullest possible impregnation of the resin into the reinforcing fibers is highly desired.

The sleeve 13 may be in the form of a cylindrical annulus, having a radially outwardly directed surface 14 for presenting a bonding area for attachment to the shaft portion 11. The bonding surface 14 of the sleeves 13 may be provided with one or more mechanical anchoring means such as radially extending lugs and circumferential ribs, as disclosed in copending U.S. Patent Applications Nos. 854,630 and 854,684 owned by our common assignee, Shakespeare Company.

An end portion 15 of the sleeve 13 extends longitudinally outwardly of the shaft portion 11 to provide access for attachment of the yoke 12 by way of a bridge portion 16 to the sleeve 13 as by welding. The end portion 15 also provides a surface for the attachment of balancing weights 18 by suitable means.

The bonding surface 14 of the sleeve 13 may be coated with resin, to enhance and promote adhesion of the shaft portion 11 to the sleeve 13.

The shaft portion 11 comprises a plurality of layers of resin impregnated fibers 20. The innermost layer 21 of fibers is preferably spirally oriented, that is, oriented with respect to the longitudinal axis of the shaft at an angle within the range of about 80° to 90°. An angle within the range of 85° to 87° is highly satisfactory.

Such a spiral orientation of the inner layer 21 provides the shaft 11 with the hoop strength and stiffness necessary to prevent buckling and "egg-shaping," or circular deformation, of the shaft while under torsional or flexural load. It is preferred that the fibers which comprise the inner layer have a Young's Modulus of at least $10 \times 10^6$ psi ($6.9 \times 10^{10}$ N/m$^2$).

The inner laminate, or spiral layer 21, may abut the sleeve 13, but should not extend over the sleeve bonding surface 14. As stated above, any overlapping configuration has been found to adversely affect the bonding between the sleeve 13 and fiber reinforced shaft 11.

A plurality of layers of fibers 20 are disposed radially outwardly with respect to the inner spiral layer 21. Each such layer may be oriented with respect to a line parallel to the longitudinal axis of the shaft 11 at a helix angle within the range of 0° to about 65°. Preferably a single helix angle will be presented by all fibers within a layer in order to insure uniform strength throughout the length of the shaft 11. However, the variation of the helix angle over the length of the shaft 11 will not defeat the concept of the invention to be further described herein.

The helically oriented layers 22 and 23, depicted in FIG. 1, impart torsional rigidity to the shaft 11 and contribute to the attainment of the critical speed required for automotive drive shaft assemblies. The first helical layer 22 may have a helix angle within the range of about 25° to about 65°, with a helix angle of 45° being preferred. The second helical layer 23 should have about the same helix angle as does the first helical layer 22, but the helical orientation of the second helical layer 23 should be of opposite hand to that of the first helical layer 22.

The longitudinally oriented layers 24 and 25, depicted in FIG. 1, impart flexural rigidity to the shaft 11 and also contribute to the attainment of the critical speed required for automotive drive shafts. The resin impregnated fibers in the longitudinal layers 24 and 25 preferably have a helix angle of about 0° with respect to a line parallel to the longitudinal axis of the shaft 11.

Layers comprised of fibers having helix angles of greater than 0° but less than about 25° have a substantial "longitudinal component" to their conformational orientation and contribute flexural rigidity to the shaft 11. Fibers having such helix angles may either comprise the longitudinally oriented layers 24 and 25, or may supplement one or more layers 24 and 25 having a helix angle of about 0°.

Layers comprised of fibers having helix angles of 25° or greater have progressively lower "longitudinal components" in their conformation, and thus are generally less effective in resisting flexural forces, just as layers comprised of fibers having helix angles of less than 25° are less effective in resisting torsional forces. The combination of the two types of layers in a single shaft, however, reinforce each other with regard to both types of forces, torsional and flexural, to a greater extent than would be expected merely from addition of their separate strengths with regard to the respective forces.

The fiber reinforced plastic shaft 11 has a radially inwardly directed surface 30 at each end for bonding the shaft 11 to the sleeves 13. The shaft inwardly directed bonding surface 30 is coextensive with the sleeve outwardly directed bonding surface 14, and is comprised of the inner surface of the fiber/resin matrix composite layer 22 of the shaft 11 which first embracingly envelopes the bonding surface 14 of the sleeve 13. The orientation of the fibers within the first sleeve engaging layer 22 should be either helical or longitudinal, as described above,—i.e., the fibers should have a helix angle within the range of 0° to about 65° with respect to a line parallel to the longitudinal axis of the shaft 11.

Such a configuration as set forth above exhibits an increased bonding capability of the shaft 11—sleeve 13 connection. It is thought that, whereas a spiral fiber wrap's inherent hoop strength prevents the fiber/resin matrix composite from contracting upon cooling to an equal or greater extent than does the metallic sleeve 13 (which sleeve 13 is heated during cure or in normal operation together with the fiber reinforced plastic shaft 11) and results in a stressing of the adhesive, resin film therebetween, a helical wrap within the range of 0° to about 65° allows the fiber/resin matrix composite to contract to a greater extent, thereby conformingly gripping and enveloping the sleeve 13.

The resin alone would have a tendency to so contract, generally having a higher thermal coefficient of expansion (and thus of contraction) than the metals suitable for use in the sleeve. In a spiral wrap fiber/resin laminate, however, the resin is prevented from doing so by the fibers which generally have a lower thermal coefficient of expansion than the metals. The spirally oriented fiber, in resisting circular deformation, will not conformingly contract upon the sleeve 13 during cooling.

The orientation of the fibers having a helix angle within the range of 0° to about 65°, allows the cooling resin matrix, which impregnates the fibers, to pull the fiber/resin matrix composite into conforming and gripping contact with the metallic sleeve. It is thought that perhaps the fibers so oriented, having a low hoop strength, undergo slight changes in their angular or conformational orientation in response to the resin contraction upon cooling, and in doing so, grippingly engage the sleeve. It is also thought that this phenomenon may be contributed to by the effect of the angular disposition of the fibers on the magnitude of the thermal coefficient of expansion of the fibers.

Of course, the thermal coefficient of expansion differs for the particular metal, fibers and resins used (for example, graphite may even exhibit a negative longitudinal thermal coefficient of expansion) but the principle involved remains the same. The formation of the radially, inwardly directed bonding surface 30, by resin impregnated fibers oriented other than in a spiral wrap (having helix angles greater than about 80°), or generally oriented within the range of helix angles from 0° to about 65° (the range in which requisite drive shaft properties may be met), results in improved adhesion and bonding between the fiber reinforced plastic shaft 11 and metallic sleeve 13.

It is preferred that the first sleeve-engaging layer 22 be helical, or generally have a helix angle within the range of 25° to 65°. A helix angle of 45° is considered optimum in view of the bonding strength obtained as well as the greatest torsional rigidity being exhibited by fibers in that orientation.

It is also preferred that the shaft 11 have an outer spiral layer 26, optimally being the outermost layer, to prevent external circular deformation of the shaft 11 and to impart greater hoop strength to the shaft 11. This layer may be terminated at the inner edge of the sleeve 13. However, as there are preferably a plurality of layers of the fiber/resin matrix composite between the first sleeve-engaging layer 22 and the outer spiral layer 26, deleterious thermal contraction effects are mitigated and the outer spiral layer 26 may extend over the sleeve 13 to the same extent as the sleeve engaging layer 22, as do the intermediate layers 23 to 25.

In an alternative embodiment of the invention, depicted in FIG. 2, a suitable cloth coating 31 is disposed between the resin coated sleeve bonding surface 14 and the first sleeve-engaging layer 22. A woven, silane-treated glass cloth 31 is preferred, in which the warp and fill of the cloth is oriented at 45° with respect to a line parallel to the longitudinal axis of the sleeve 13. Besides enhancing the bonding capacity of the shaft 11—sleeve 13 connection, the glass cloth 31 insulates against electrolysis if graphite fibers are to be employed.

It has been determined that a high stress condition is present at the bond junction of the steel sleeve and the composite fiber reinforced plastic shaft, resulting from the fact that the product of the shear modulus and the polar moment of inertia for the steel sleeve is almost five times that of the shaft. Accordingly, in order to reduce the maximum stress at the junction, it is preferred to taper the thickness of the glass cloth from the outer to the inner edge of the steel sleeve to produce a more gradual change in stress.

Referring to FIG. 4 of the drawings, a schematic cross section of the joint between the metal sleeve and the plastic shaft is shown, and FIG. 5 immediately below is a graph representing the stress distribution over the bonding area A where the glass cloth 31 is coextensive with the bonding area of the sleeve. The curve shows that the highest stress is at the inner edge E of the sleeve 13.

Figure 6:
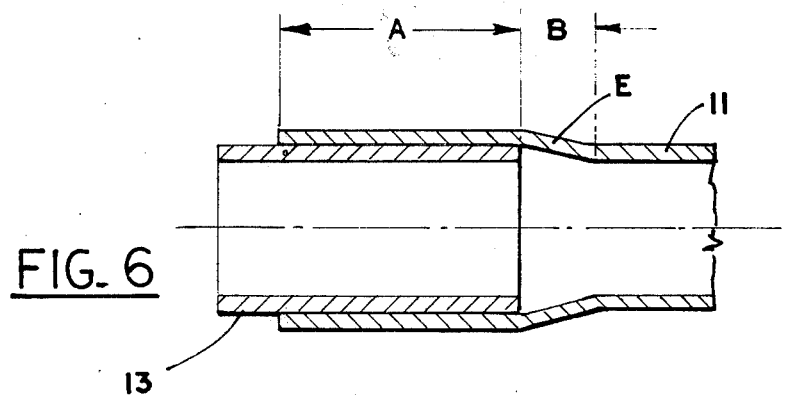
FIG. 6 is a view similar to FIG. 4 in which the inner layer of glass cloth is tapered and extends inwardly beyond the bonding area of the sleeve and overlaps the inner spiral fiber reinforced layer.
Figure 7:
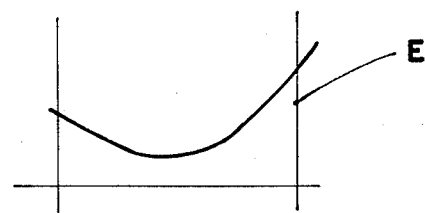
FIG. 7 is a graph representing the stress distribution over the bonding area of the joint of FIG. 6.

FIG. 6 is a schematic cross section similar to FIG. 4 in which the glass cloth 131 is tapered in thickness inwardly from the inner edge of the bonding area A and extends inwardly a short distance beyond the inner edge of the sleeve, as represented by the area B, in overlapping relation with the inner spiral fiber reinforced layer 21. The graph FIG. 7 below FIG. 6 represents the stress distribution over the bonding area A when the tapered glass cloth is used. It is noted that the highest stress at E is substantially reduced.

Figure 8:
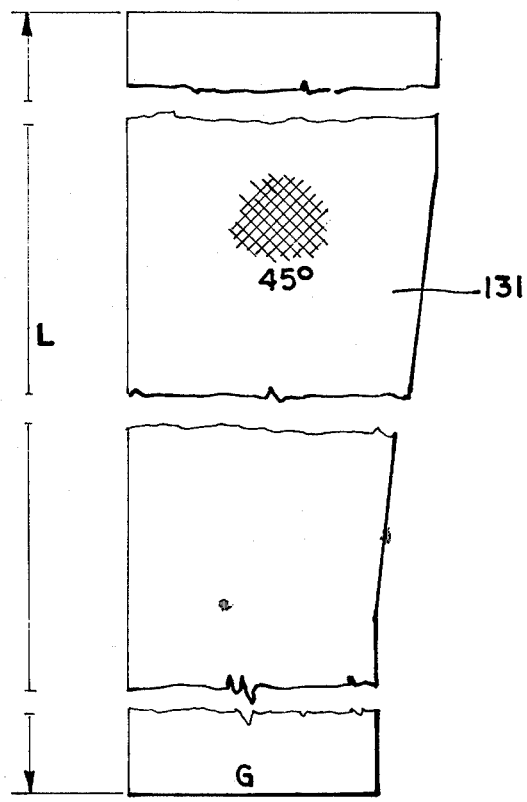
FIG. 8 is a view showing the shape of the blank of glass cloth used to obtain the inner layer of tapered thickness.

A preferred method of tapering the thickness of the glass cloth 131 is to use a flat piece of the shape shown in FIG. 8, in which the total length L is sufficient for four wraps around the sleeve portion A and the portion G is long enough for one wrap, and has a width substantially equal to the length of the bonding area A. As the cloth 131 is wrapped around the sleeve the thickness of the cloth is tapered to the reduced thickness of one wrap in area B extending beyond the area A.

A further reduction of the maximum stress at the inner edge E of the sleeve may be obtained by tapering the thickness of the metal sleeve from its outer edge to its inner edge.

A drive shaft assembly 10 embodying the concept of the present invention is produced by first providing a pair of sleeves 13 to be incorporated in the assembly 10. The sleeves may have at least one anchoring means such as an annular rib, ridges and furrows, or an annular depression, with or without a raised radial lug disposed therein.

The sleeves 13 are subjected to sandblasting, to remove metal oxide and increase surface area (through pitting). The sleeves 13 are then quickly cleaned with a degreasing solvent and dried. As soon as is practicable, the dried sleeves 13 are coated over the bonding surface 14 with the resin matrix system of the fiber reinforced plastic shaft 11. At this point a fibrous cloth such as a silane-treated glass cloth 31 may be conformingly layered onto the bonding surface 14 of the sleeves 13, and impregnated with resin.

The resin-coated sleeves 13 are subjected to heat in order to cure the resin for a suitable period of time, such as for 30 minutes at 300° F. (150° C.), to complete the preparation of the sleeves 13. Subsequent adhesion to the shaft 11 is enhanced by maintaining the coated sleeves 13 in a clean condition prior to final assembly with the shaft 11.

The sleeves 13 are mounted on a mandrel in longitudinally spaced disposition determined by the length desired for the finished assembly 10. The mandrel may be consumable and become an integral core, or the mandrel may be removable. In the latter event it may be desirable to have the mandrel at least minutely tapered in order to facilitate subsequent removal. However, a collapsible mandrel may certainly be employed in those situations where even a minute taper would be deemed undesirable.

Should one elect to employ a consumable mandrel, it may be of any desired material such as itself being a fiber reinforced plastic, a foamed plastic or a thin walled, metallic tubing.

If glass cloth 31 or 131 is used, it is wrapped around the resin-coated metal sleeve 14 prior to applying the several outer layers of the fiber-reinforced plastic shaft.

The application of the fiber reinforced plastic material may be accomplished in any number of ways. That is, the fibers may be in the form of individual filaments, rovings, tapes or cloth which are resin impregnated. One highly acceptable apparatus and method for applying the resin impregnated fibers is shown in U.S. Pat. No. 4,089,727 owned by our common assignee, Shakespeare Company.

The resin impregnated fibers are added to the mandrel in a manner such that if an inner spiral wrap is effected, the spiral wrap will not extend onto the bonding surface 14 of the sleeves 13.

The fibers in the first sleeve-engaging layer 22 are applied so as to have a helix angle within the range set forth above, in which the hoop strength of the fibers so oriented is not sufficient to prevent the contraction of the fiber/resin matrix composite into conforming and gripping contact with the sleeve 13, upon cooling. Irrespective of the particular fibers employed, the matrix resin and impregnated fibers will thus conform to the configuration of the outwardly directed sleeve surface 14, and effect an integral connection of the sleeves 13 and shaft 11.

The first sleeve-engaging layer 22, which is preferably helical, is applied to the mandrel with spaced sleeves 13 thereon. If the first such layer is helical, the next layer is preferably applied at substantially the same angle, but with opposite hand. The desired number of helically and longitudinally oriented layers are applied to the mandrel-sleeve 13 assembly, and it is preferred that an outer spiral wrap also be applied.

The drive shaft assembly 10 is then heated until the resin contained therein is cured. Subsequent to the curing of the fiber reinforced plastic, the mandrel, if it is of the removable variety, is removed. Thereupon a desired bridge 16 is secured to each sleeve 13. The yoke 12 may be secured to the bridge 16 either before or after the bridge 16 is secured to the sleeve 13. With the drive shaft assembly 10 thus completed it is dynamically balanced by affixing any required weights 18 to the required location on the end portion 15 of one or both sleeves 13.

In an alternative method, the sleeves 13 are prepared as above and a fiber reinforced plastic shaft 11 of the structure disclosed above is prepared on a mandrel, such that any inner spiral layer 21 does not extend onto the radially, inwardly directed bonding surface 30. The shaft 11 is cured and removed from the mandrel.

A suitable resin or adhesive may be used to bond the sleeve 13 to the shaft 11, as the outwardly directed bonding surface of the sleeves 14 are fitted to the conforming, inwardly directed bonding surfaces 30 of the shaft 11.

The resin film between the adjacent fibers 20 and the metal sleeve 13 which bonds the composite shaft portion 11 to the sleeve 13 is very thin, on the order of about 0.002 inch (0.0048 cm). Any slight physical dimensional changes due to thermal contraction induces high stress in the adhesive film. Thus, it is important that the sleeve 13 does not contract away from the first contacting layer 22 upon cooling. It is therefore necessary that the effective thermal coefficient of expansion for the shaft portion 11, as a function of the orientation of the fibers 20 contained therein, be greater than or equal to the effective thermal coefficient of expansion of the metal sleeve 13 which it contacts.

The effective linear thermal coefficients of expansion were experimentally determined for (A) a steel sleeve 13; (B) a composite shaft 11 having an inner spiral layer 21 (of 88°) over the inwardly directed bonding surface 30; (C) a composite shaft 11 without an inner spiral layer but with an outer spiral layer disposed over the sleeve 13 and having its inner helical layer 22 oriented at about 45° contacting the bonding surface 30; (D) a composite shaft without an inner or outer spiral layer disposed over its inwardly directed bonding surface 30 and having its inner helical layer disposed at about 45° contacting the bonding surface. The results of the test are shown in Table I.

TABLE 1

| | | Average Measured Dimensions | | Effective Linear Thermal |
|---|---|---|---|---|
| | | 300° F. (149° C.) | 80° F. (27° C.) | Coefficient of Expansion |
| A | Steel Sleeve (Length) | 5.013 in. (12.733 cm) | 5.003 in. (12.708 cm) | $9.1 \times 10^{-6}$ in./in./°F. ($16.38 \times 10^{-6}$ cm/cm/°C.) |
| B | Composite Shaft dia. (With upper & outer spiral wraps) | 3.8095 in. (9.675 cm) | 3.8050 in. (9.665 cm) | $5.4 \times 10^{-6}$ in./in./°F. ($9.72 \times 10^{-6}$ cm/cm/°C.) |
| C | Composite Shaft dia. (No inner spiral wrap) | 3.8505 in. (9.780 cm) | 3.8390 in. (9.751 cm) | $13.6 \times 10^{-6}$ in./in./°F. ($24.48 \times 10^{-6}$ cm/cm/°C.) |
| D | Composite Shaft dia. (No inner or outer spiral wrap) | 3.851 in. (9.781 cm) | 3.834 in. (9.738 cm) | $20.2 \times 10^{-6}$ in./in./°F. ($36.36 \times 10^{-6}$ cm/cm/°C.) |

The dimensional changes in the length of the steel sleeve 13 and in the diameter of the composite shafts 11 were measured over the range of 80° to 300° F. (27° C.–149° C.), the diameter being measured at four positions and an average value being determined. As is seen in Table I, the effective linear thermal coefficient of expansion for composite shafts C and D are greater than for sleeve A, while the coefficient for composite shaft B is lower. Shafts C and D would therefore contract onto sleeve A while cooling and would engagingly grip it, while shaft B would not contract as much as sleeve A, causing a stress upon the adhesive film therebetween.

An epoxy resin was used in the tested composite shaft 11, and the spiral 21 and 22 and helical 22 fibers used were E-glass fibers. A drive shaft which has been tested and proven to be very effective as constructed according to the concepts of the present invention, has the following conformation:

Steel sleeves 13 are secured to a composite shaft 11 having an inner spiral layer 21 of glass fibers, which layer does not extend over the bonding surface 14 of the sleeves 13. The first helical layer 22 is composed of glass fibers oriented at 45° with respect to the longitudinal axis of the shaft 11, and this first helical layer provides the inwardly directed bonding surface 30. The next layer 23 is of glass fibers also helically disposed, also at a 45° angle, but is of opposite hand as is the first helical layer 22. There are two longitudinally oriented layers 24 and 25 of graphite fibers disposed radially outwardly of the helical layers 22 and 23, and an outer spiral layer 26 of glass fibers envelops these. An epoxy resin system is used for the resin matrix. The percentage of the weight of the graphite fibers as compared to the total weight of all fibers in this shaft is preferably in the range of 25% to 35%. Of course, this conformation is merely exemplary and not limiting, the scope of the invention being limited solely by the attached claims.

It should now be apparent that a drive shaft assembly embodying the concept of the present invention, and made according to the improved method thereof, provides improved critical speed characteristics as well as an effective and convenient interconnection between the fiber reinforced plastic shaft portion and the metallic yoke of a universal joint while accomplishing the other objects of the invention.

We claim:

1. A drive shaft assembly comprising:
   a tubular, fiber-reinforced plastic shaft portion having layers of oppositely angled resin-impregnated helical fibers at 25°–65° to the longitudinal shaft axis and at least one layer having substantially longitudinal fibers forming a laminate,
   at least one layer of said laminate having an interior bonding surface,
   a metallic sleeve received within at least one end of said laminate and having an exterior bonding surface bonded to said interior bonding surface;
   said shaft portion having an inner spiral layer of closely wound fibers at 80°–90° to the longitudinal shaft axis, said layer terminating at the inner edge of said sleeve;
   whereby said layer of longitudinal fibers provides flexural rigidity to the laminate, said oppositely angled layers provide torsional strength while allowing radial contraction thereof to grip the sleeve, and said inner spiral layer provides additional hoop strength to the laminate.

2. A drive shaft assembly as defined in claim 1, wherein the laminate is provided with a layer of glass cloth having oppositely angled fibers bonded to the exterior surface of said sleeve and to said interior bonding surface of said laminate.

3. A drive shaft assembly as defined in claim 2, wherein the layer of fiber glass cloth tapers in thickness from the outer to the inner edge of said sleeve and extends inwardly beyond the inner edge of the sleeve in overlapping relation with said inner spiral layer.

4. A drive shaft assembly as defined in claim 3, wherein the fiber glass cloth comprises a plurality of wraps around said sleeve, the number of wraps decreasing progressively from the outer edge of the sleeve and terminating slightly beyond its inner edge.

5. A drive shaft assembly as defined in claim 1, wherein the laminate has at least one layer of longitudinal fibers.

6. A drive shaft assembly as defined in claim 5, wherein the laminate is provided with an inner layer of glass cloth having oppositely angled fibers bonded to the exterior surface of said sleeve.

7. A drive shaft assembly as defined in claim 6, wherein the layer of fiber glass cloth tapers in thickness from the outer to the inner edge of said sleeve and extends inwardly beyond the inner edge of the sleeve in overlapping relation with said inner spiral layer.

8. A drive shaft assembly as defined in claim 7, wherein the fiber glass cloth comprises a plurality of wraps around said sleeve, the number of wraps decreasing progressively from the outer edge of the sleeve and terminating slightly beyond its inner edge.

9. A drive shaft assembly as defined in claim 1, wherein said shaft portion has an outer spiral layer of closely wound fibers at 80°–90° to the longitudinal shaft axis.

10. A drive shaft assembly as defined in claim 9, wherein the laminate is provided with an inner layer of glass cloth having oppositely angled fibers bonded to the exterior surface of said sleeve.

11. A drive shaft assembly as defined in claim 10, wherein the layer of fiber glass cloth tapers in thickness from the outer to the inner edge of said sleeve and extends inwardly beyond the inner edge of the sleeve in overlapping relation with said inner spiral layer.

12. A drive shaft assembly as defined in claim 11, wherein the fiber glass cloth comprises a plurality of wraps around said sleeve, the number of wraps decreasing progressively from the outer edge of the sleeve and terminating slightly beyond its inner edge.

13. The method of making a drive shaft assembly having a tubular fiber-reinforced plastic shaft portion with a metallic sleeve portion extending into at least one end and bonded thereto, comprising the steps of:
   coating the outer surface of a metallic sleeve with a bonding resin,
   heating the coated sleeve to cure the resin,
   mounting the coated sleeve on a cylindrical mandrel extending axially beyond the sleeve,
   applying over the exposed portion of the mandrel a layer of spirally wrapped resin-impregnated fibers at an angle of 80°–90° to the axis of the mandrel,
   applying over the wrapped mandrel and sleeve portion at least two layers of resin-impregnated oppositely angled helically wrapped fibers at an angle of 25°–65° to the axis of the mandrel,
   applying over the wrapped mandrel and sleeve portion at least one layer of resin-impregnated fibers extending substantially longitudinally of the mandrel, and
   heating the assembly until the resin contained therein is cured.

14. The method as defined in claim 13, wherein a layer of glass cloth having oppositely angled fibers is bonded to the sleeve prior to applying a layer of resin-impregnated helically wound fibers thereover.

15. The method as defined in claim 14, wherein a layer of spirally wrapped resin-impregnated fibers is applied over the outer layer of fibers previously applied over the mandrel.

16. The method as defined in claim 15, wherein the layer of glass cloth is tapered in thickness from the outer to the inner edge of the sleeve and extends inwardly beyond the inner edge of the sleeve in overlapping relation with said inner spiral layer.

17. The method as defined in claim 13, wherein an outer layer of spirally wrapped resin-impregnated fibers at 80°–90° is applied over the assembly.

18. The method as defined in claim 17, wherein a layer of glass cloth having oppositely angled fibers is bonded to the sleeve prior to applying a layer of resin-impregnated helically wound fibers thereover.

19. The method as defined in claim 18, wherein a layer of spirally wrapped resin-impregnated fibers is applied over the outer layer of fibers previously applied over the mandrel.

20. The method as defined in claim 19, wherein the layer of glass cloth is tapered in thickness from the outer to the inner edge of the sleeve and extends inwardly beyond the inner edge of the sleeve in overlapping relation with said inner spiral layer.

21. The method of making a drive shaft assembly having a tubular fiber-reinforced plastic shaft portion with a metallic sleeve portion extending into at least one end of the plastic shaft portion and bonded thereto, comprising the steps of:
   coating the outer surface of a metallic sleeve with a bonding resin,
   heating the coated sleeve to cure the resin,
   mounting the coated sleeve on a cylindrical mandrel extending axially beyond the sleeve,
   applying over the exposed portion of the mandrel a layer of spirally wrapped resin-impregnated fibers at an angle of 80°–90° to the axis of the mandrel,
   applying over the wrapped mandrel and sleeve a laminate having layers of resin-impregnated oppositely angled helically disposed fibers at angles of 25°–65° to the axis of the mandrel and at least one layer of resin-impregnated fibers extending substantially longitudinally of said mandrel, at least one layer of said laminate having an interior bonding surface contacting said coated sleeve,
   applying over said laminate an outer layer of spirally wrapped resin-impregnated fibers at an angle of 80°–90° to the axis of said mandrel, and
   heating the assembly until the resin contained therein is cured.

22. The method as defined in claim 21, wherein a layer of glass cloth having oppositely angled fibers is applied to the sleeve prior to applying said laminate.

* * * * *